United States Patent Office

2,897,047
Patented July 28, 1959

2,897,047
METHOD OF DISSOLVING METALLIC URANIUM

Wallace W. Schulz, Richland, Wash., assignor to the United States of America as represented by the United States Atomic Energy Commission No Drawing. Application February 26, 1954
Serial No. 416,725

4 Claims. (Cl. 23—14.5)

This invention deals with a process of dissolving metallic uranium.

Uranium is widely used in neutronic reactors in the form of fuel elements. Fuel elements are usually dissolved, after they have been exposed to neutronic irradiation, for the purpose of separating from each other and recovering the plutonium, the fission products formed and also the non-reacted uranium. Some fuel elements are also dissolved when they have been found flawy in the examination prior to their use, in order to recover the uranium. Nitric acid is usually chosen for the dissolution of uranium; however, the nitric acid reaction proceeds rather slowly.

It is an object of this invention to provide a process of dissolving uranium metal in nitric acid by which an increased rate of solution is obtained.

It has been found that the dissolution of uranium metal in nitric acid is considerably accelerated if a small quantity of ortho-phosphoric acid is added to the nitric acid.

Concentrated nitric acid is more advantageous for dissolving uranium than diluted solutions thereof and it has been found that the nitric acid should have a concentration of at least 5 M, but preferably of 10 M or above, in order to obtain a reasonable dissolution rate. Weaker nitric acids, however, are operative. Moreover, the efficiency of the phosphoric acid is greater at higher nitric acid concentrations. The concentration of the phosphoric acid best operative is one between 0.01 and 0.15 M, the concentration between 0.1 and 0.15 M being the preferred range. With phosphoric acid concentrations above 0.15 M, the degree of improvement of the dissolution rate decreases, and this is particularly true at low nitric acid concentrations.

It has also been found that the addition of uranyl nitrate and/or calcium nitrate to the phosphoric acid-containing nitric acid still furthermore increases the dissolution rate.

A great many tests have been carried out some of which will be described in the two examples given below. For these tests wafers of uranium metal were used which had a diameter of 1⅜ inches, a thickness of ½ inch and which weighed about 200 grams; these wafers had been cut from fuel elements that had been rolled in the alpha-phase (below 660° C.) and then heat-treated in the beta-phase (660–770° C.). The average grain size in these uranium wafers was 0.033 mm.

The dissolution rate was ascertained by immersing the wafers for 2 minutes in 500 ml. of boiling solutions that had varying contents of nitric acid and phosphoric acid. After immersion, the wafers were washed with water, dried with acetone, and weighed. The dissolution rate was calculated from the decrease of weight and of dimensions, and the weight loss was expressed in mg./hr./cm.². A fresh wafer was used for each determination.

EXAMPLE I

Boiling nitric acid of concentrations ranging between 2.0 and 15.7 M was used in these tests; the phosphoric acid content in these nitric acids varied within the range of from 0 to 0.2 M. The results of the experiments are summarized in Table I.

Table 1

| $H_3PO_4$, M | $HNO_3$, M | Dissolving rate, mg./hr./cm.² |
|---|---|---|
| 0.0 | 15.7 | 2,900 |
| 0.01 | 15.7 | 4,480 |
| 0.05 | 15.7 | 7,230 |
| 0.10 | 15.7 | 8,640 |
| 0.15 | 15.7 | 8,900 |
| 0.20 | 15.7 | 8,540 |
| 0.0 | 10.0 | 740 |
| 0.01 | 10.0 | 960 |
| 0.05 | 10.0 | 1,520 |
| 0.10 | 10.0 | 1,700 |
| 0.20 | 10.0 | 2,180 |
| 0.0 | 7.5 | 350 |
| 0.01 | 7.5 | 460 |
| 0.05 | 7.5 | 570 |
| 0.10 | 7.5 | 690 |
| 0.15 | 7.5 | 760 |
| 0.20 | 7.5 | 750 |
| 0.0 | 5.0 | 150 |
| 0.01 | 5.0 | 160 |
| 0.10 | 5.0 | 220 |
| 0.15 | 5.0 | 270 |
| 0.20 | 5.0 | 260 |
| 0.0 | 2.0 | 26 |
| 0.01 | 2.0 | 22 |
| 0.05 | 2.0 | 24 |
| 0.10 | 2.0 | 25 |
| 0.15 | 2.0 | 21 |
| 0.20 | 2.0 | 10 |

These data show (a) that concentrated nitric acid yields a much higher dissolution rate than weaker solutions thereof; (b) that phosphoric acid considerably improves the dissolution rate; (c) that the improvement by phosphoric acid increases steadily up to a concentration of 0.15 M phosphoric acid, with the exception of the 10 M nitric acid solutions where a phosphoric acid concentration of 0.20 still increased the improvement over that obtained with 0.15 M phosphoric acid; and (d) that both the relative and the absolute degree of improvement brought about by the addition of phosphoric acid are greater the higher the concentration of the nitric acid used is.

EXAMPLE II

Two parallel experiments were carried out with two uranium wafers. One of the wafers weighed 192.4 grams and had a surface area of 33.0 cm.²; this wafer was immersed in boiling 13 M nitric acid. The other wafer weighed 197.5 grams and had a surface area of 33.1 cm.²; it was immersed in 13 M nitric acid 0.1 M in phosphoric acid for the determination of the dissolution rate. The quantity of nitric acid in this instance had been calculated so as to leave a nitric acid concentration of approximately 2 M in the final solution after complete uranium dissolution; the amount used therefore was 410 ml. in each instance. Dissolution was carried out under reflux conditions to maintain the volume of the solution as constant as possible. After various time intervals, samples of each solution were removed and analyzed for their uranium and nitric acid contents. The results are compiled in Table II.

Table II

| Dissolution time (min.) | 0.1 M in H₃PO₄ ||| No H₃PO₄ |||
|---|---|---|---|---|---|---|
| | U, g./l. | HNO₃, M | Percent of wafer dissolved | U, g./l. | NHO₃, M | Percent of wafer dissolved |
| 0 | 0 | 13.0 | 0 | 0.0 | 13.0 | 0 |
| 6 | 78 | 11.9 | 16 | 10.8 | 12.9 | 2 |
| 10 | 144 | 10.7 | 30 | 27.3 | 12.6 | 6 |
| 20 | 280 | 8.1 | 56 | 61.6 | 11.3 | 13 |
| 40 | 386 | 5.2 | 80 | 114 | 10.3 | 24 |
| 60 | 424 | 3.3 | 89 | 167 | 9.7 | 35 |
| 90 | 442 | 2.2 | 92 | 243 | 7.9 | 50 |
| 120 | 465 | 1.7 | 97 | 300 | 7.0 | 62 |
| 155 | | | | 358 | 6.3 | 74 |
| 210 | | | | 405 | 5.0 | 84 |
| 240 | | | | 450 | 4.4 | 93 |
| 270 | | | | 496 | 3.6 | 99 |

This example also shows the superiority of phosphoric acid-containing nitric acid over nitric acid alone. While, for instance, 80% of the wafer was dissolved in 40 minutes with the phosphoric acid-containing solution, the nitric acid alone required about 200 minutes to obtain the same result.

It will be understood that this invention is not to be limited to the details given herein but that it may be modified within the scope of the appended claims.

What is claimed is:

1. A process of dissolving uranium metal comprising contacting the uranium with a mixture of concentrated nitric acid and ortho-phosphoric acid at elevated temperatures.

2. The process of claim 1 in which the nitric acid concentration is at least 5 M and the phosphoric acid concentration ranges between 0.01 and 0.15 M.

3. The process of claim 2 in which the nitric acid concentration is at least 10 M.

4. The process of claim 2 in which the phosphoric acid concentration is 0.1 M.

No references cited.